(12) United States Patent
Matsumoto

(10) Patent No.: US 6,519,432 B1
(45) Date of Patent: Feb. 11, 2003

(54) IMAGE FORMING APPARATUS

(75) Inventor: Kazuo Matsumoto, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,908

(22) Filed: Jul. 17, 2001

(51) Int. Cl.[7] .......................... G03G 15/00; G03G 15/01
(52) U.S. Cl. ........................................ 399/167; 399/299
(58) Field of Search ................................ 399/167, 299, 399/179; 318/34, 39, 51, 53, 59, 66, 67, 68

(56) References Cited

U.S. PATENT DOCUMENTS 5,386,286 A  * 1/1995 Kinouchi et al. ........... 399/299

6,173,141 B1   1/2001 Sakagami et al. .......... 399/167

FOREIGN PATENT DOCUMENTS

| JP | 2-157868 | 6/1990 |
| JP | 9-50165 | 2/1997 |
| JP | 11-24356 | 1/1999 |

* cited by examiner

*Primary Examiner*—Susan S. Y. Lee
(74) *Attorney, Agent, or Firm*—Foley & Lardner

(57) ABSTRACT

In the image forming apparatus and method of the present invention, the reference clock is rendered common and a reference multiplication/division circuit is provided before a motor control part, if two motors which output different numbers of FG pulses per rotation are used or if motors which output equal numbers of frequency generator (FG) pulses per rotation are used at different deceleration ratios. As a result, synchronization with FG cycles can be achieved.

8 Claims, 4 Drawing Sheets

IMAGE FORMING APPARATUS

BACKGROUND OF THE INVENTION

The present invention relates to an image forming apparatus such as a full-color copying machine, a color printer, or the like.

A so-called train-of-four tandem full-color copying machine is known as an image forming apparatus which outputs a color image. In this train-of-four tandem full-color copying machine, four image forming units which respectively form toner images of colors of yellow (Y), magenta (M), cyan (C), and black (B) are provided in parallel along a conveyor belt, based on an image signal subjected to color separation. A DC motor is adopted as a drive system thereof.

As shown in FIG. 1A, the train-of-four tandem full-color copying machine as an image forming apparatus according to the prior art generally adopts a "4-motor system" in which four photosensitive drums 100Y, 100M, 100C, and 100B are respectively driven by motors 101Y, 101M, 101C, and 101B.

In contrast, as shown in FIG. 1B, it is possible to adopt a "1-motor system" in which four photosensitive drums 100Y, 100M, 100C, and 100B are all driven by one motor 102.

In case of adopting this 1-motor system, an electronic clutch or a mechanical 1-way clutch is adopted to switch a color mode in which the four photosensitive drums 100Y, 100M, 100C, and 100B are all driven and a black mode in which only the black photosensitive drum 100B is driven. The 1-motor system provides a merit, compared with the 4-motor system.

However, there is a problem that image jitters may occur depending on the precision of mesh at the clutch part. Therefore, gears with a highly precise mechanism are required in the case of adopting the 1-motor system.

Meanwhile, as shown in FIG. 1C, a "2-motor system" can be adopted, i.e., three photosensitive drums 100Y, 100M, and 100C are driven by one motor 103 through a gear, a belt, or a roller and the remaining black photosensitive drum 100B is driven by another motor 104.

If the 2-motor system is adopted, the clutch part can be omitted, so that image jitters caused by mesh at the clutch part can be avoided.

In the 2-motor system, however, the load torque ratio is 3:1 under the condition that the drive gear ratio is constant. The load difference is thus large and causes a problem.

If two motors of the same kind are adopted and if the drive gear ratio is changed to match the load torque ratio, the target peripheral velocities differ from each other so that the frequency generator (FG) pulse frequencies generated per one rotation differ greatly. Therefore, it is difficult to achieve control with high precision for synchronizing rotations of the two motors 103 and 104 in the FG cycle. Also, a difference occurs between peripheral velocities at the rising/falling times of the motors 103 and 104 due to the gear ratio. Consequently, it is difficult to match the peripheral velocities with a contacting transfer belt.

BRIEF SUMMARY OF THE INVENTION

The present invention has been made in view of the above problem and has an object of avoiding the problem of high costs when the 4-motor system is adopted and the problem of mesh at the clutch part when the 1-motor system is adopted, by adopting a 2-motor system.

That is, photosensitive drums for color components Y, M, and C are driven by one motor through a gear, belt, or roller, by adopting the 2-motor system. The photosensitive drum for the other remaining color component B is driven by another motor. In this structure, a cost-reduction and preservation of image characteristics are both achieved by reducing the clutch part.

Further, an object is to prevent a difference from occurring in the peripheral speed at the rising/falling time between the motor for driving the photosensitive drum for the color component B and the motor for driving the photosensitive drums for the color components Y, M, and C, by controlling the drive current for driving the photosensitive drum for the color component B, to delay the rising time of the motor for driving the photosensitive drum for the color component B, even if two motors respectively having different numbers of FG pulses are used.

To achieve the above objects, an image forming apparatus according to the present invention comprises: a conveyor section which conveys an image forming medium; an image forming unit having a plurality of photosensitive drums for color components of yellow, magenta, cyan, and black arranged in parallel on the conveyor part and being rotatable, to transfer images of respective colors to the image forming medium being conveyed by the conveyor part; a first motor which drives all of the photosensitive drums for the color components of yellow, magenta, and cyan through a drive mechanism; a second motor which drives the photosensitive drum for the color component of black; a reference clock generation circuit which generates a reference clock for driving the motors; a first motor control circuit which drives and controls the first motor; a second motor control circuit for driving and controlling the second motor; and a reference clock multiplication/division circuit which multiplies/divides the reference clock, to output a result to the second motor control circuit.

Further, a method of forming an image according to the present invention is based on a two-motor system in which photosensitive drums for color components of yellow, magenta, and cyan are driven by a first motor and a photosensitive drum for a color component of black is driven by a second motor, and the method comprises: a first step of conveying an image forming medium; a second step of multiplying/dividing a reference clock to output a clock to a second motor control circuit for driving and controlling the second motor; and a third step of driving the first motor by a first motor controlling circuit based on the reference clock, to drive the photosensitive drums for the color components of yellow, magenta, and cyan, and of driving the second motor by the second motor control circuit based on the multiplied/divided clock, to drive the photosensitive drum for the color component of black, thereby to transfer images of respective colors to the image forming medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, an embodiment of the present invention will be explained with reference to the drawings.

Figure 1A:
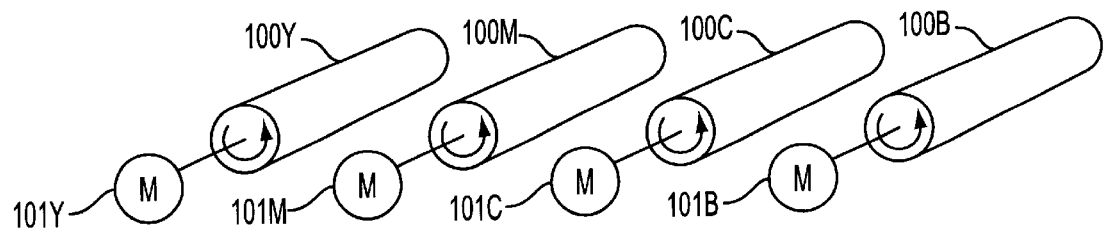
FIG. 1A is a view which explains a 4-motor system adopted in a train-of-four tandem full-color copying machine as an image forming apparatus according to the prior art.
Figure 1B:
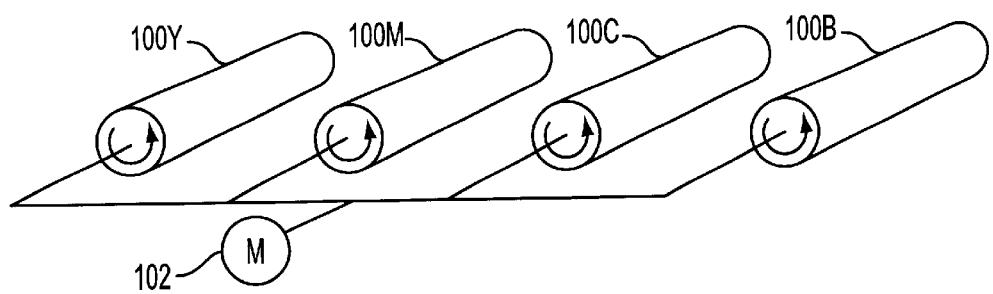
FIG. 1B is a view which explains a 1-motor system adopted in a train-of-four tandem full-color copying machine as an image forming apparatus according to the prior art.
Figure 1C:
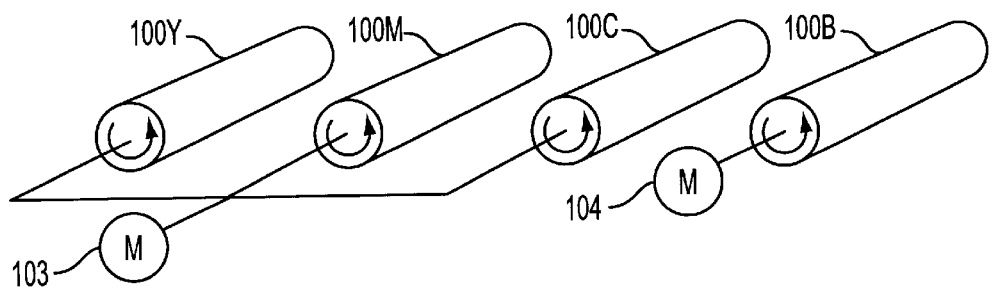
FIG. 1C is a view which explains a 2-motor system adopted in a train-of-four tandem full-color copying machine as an image forming apparatus according to the prior art.
Figure 2:
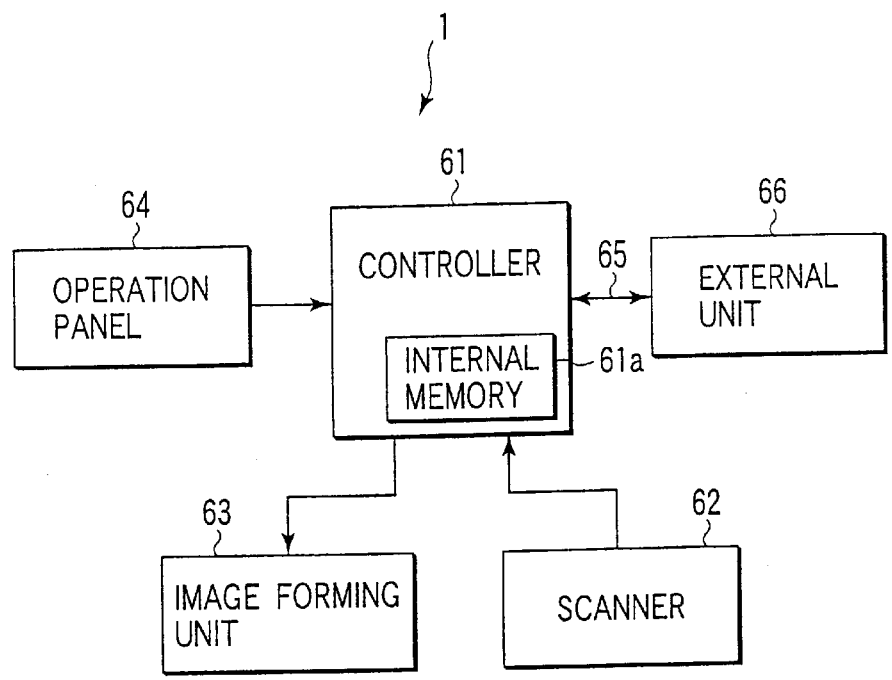
FIG. 2 is a diagram showing the structure of a color digital copying machine 1 as an example of an image forming apparatus according to an embodiment of the present invention.

FIG. 2 shows the structure of a color digital copying machine 1 as an example of an image forming apparatus according to the embodiment of the present invention, and explanation thereof will now be made below.

As shown in FIG. 2, the color digital copying machine 1 is constructed by a control part (CPU) 61, a scanner 62, an image forming unit 63, and an operation panel 64. This color digital copying machine 1 is connected with an external unit 66 such as a personal computer or the like through a communication channel 65 such as a LAN or the like.

In this structure, the control part 61 controls the entire color digital copying machine 1. The scanner 62 reads image information from a copy target not shown, to generate an image signal. The image forming unit 63 forms an image corresponding to an image signal supplied from the scanner 62 or external unit 66. The operation panel 64 is used by a user to make various settings. The control part 61 has an internal memory 61a. Self-print image patterns for identifying a rotation angle change phase are previously registered in the internal memory 61a.

Figure 3:
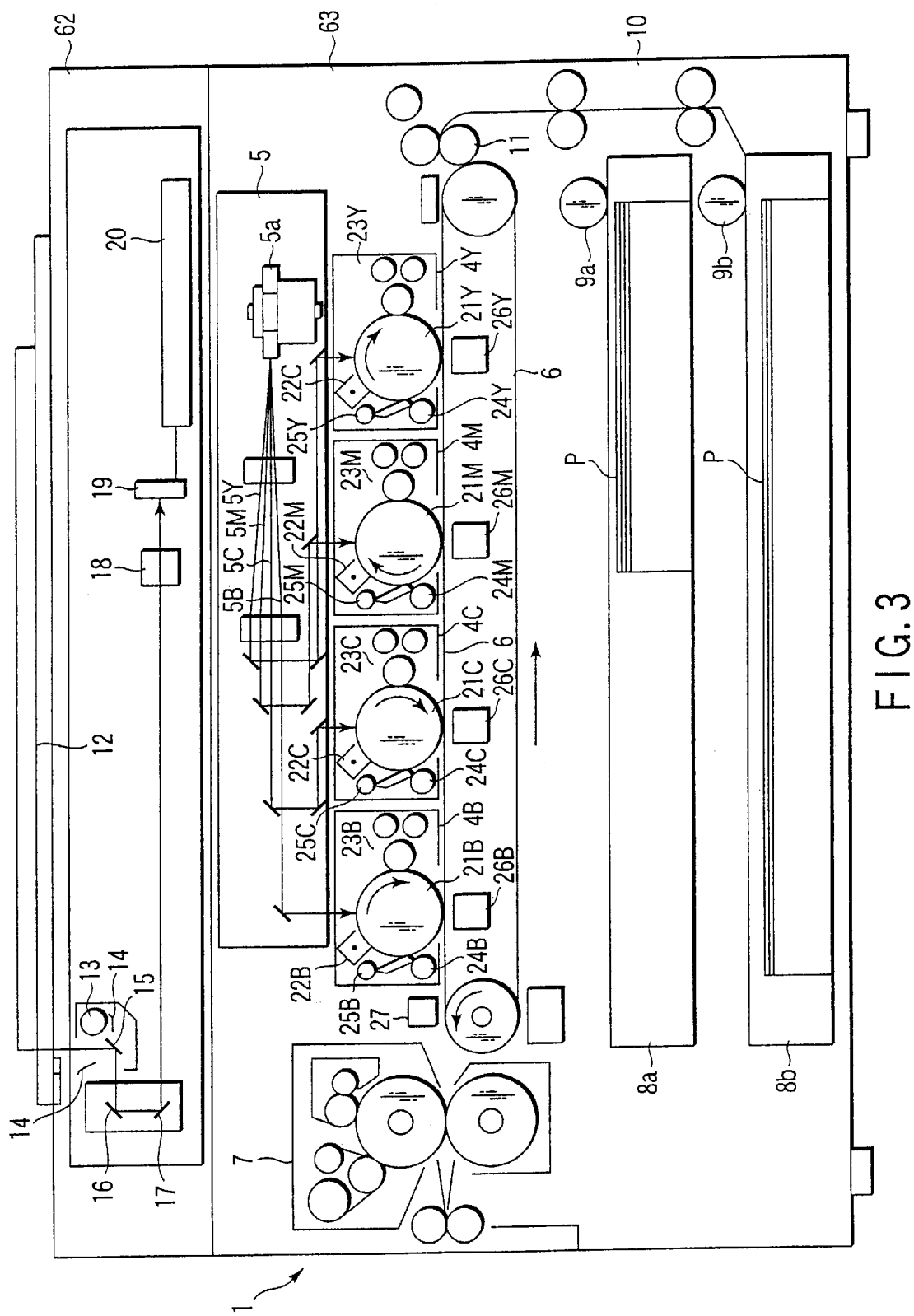
FIG. 3 is a view showing the internal structure of the color digital copying machine 1.

FIG. 3 shows the internal structure of the color digital copying machine 1 and explanation thereof will now be made below.

As shown in FIG. 3, the scanner 62 includes an illumination lamp 13, a reflector 14, reflection mirrors 15 to 17, an imaging lens 18, a light receiving element 19, and an image processing device 20. The illumination lamp 13 serves to illuminate an original document not shown but set on a document set table 12. The reflector 14 serves to converge light from the illumination lamp 13 toward the original document. An optical system 29 serves to guide light reflected from the original document toward the light receiving element 19, with use of the reflection mirrors 15 to 17, the imaging lens 18, and the like. The light receiving element 19 is a CCD or the like and serves to convert light from the original document into an electric signal. The image processing part 20 performs color separation on the photoelectrically converted electric signal, to obtain an image signal for respective colors of yellow (Y), magenta (M), cyan (C), and black (B).

The image forming unit 63 has four image forming parts 4Y, 4M, 4C, and 4B, an exposure part 5, a transfer belt 6, and a fixing part 7.

The four image forming parts 4Y, 4M, 4C, and 4B form images of a total of four colors, i.e., Y, M, and C and B for compensation for brightness and darkness, which are respective color components of subtractive primaries. The exposure part 5 serves to irradiate exposure light (e.g., a laser beam) whose light intensity is intermittently changed in correspondence with an image signal supplied from the scanner unit 62 or the outside, on the photosensitive drums 21Y, 21M, 21C, and 21B provided at the image forming parts 4Y, 4M, 4C, and 4B. The transfer belt 6 serves to overlap sequential images formed by the image forming parts 4Y, 4M, 4C, and 4B, on a paper P as a transfer material (image forming medium) while conveying the paper P. The fixing part 7 serves to press the paper P conveyed by the transfer belt 6 and an image (a developer image) on the paper P, while heating them, thereby to fix the developer image to the paper P.

The image forming parts 4Y, 4M, 4C, and 4B have a substantially equal structure and form images corresponding to respective colors by a known electro-photographic process. However, the photosensitive drums 21Y, 21M, 21C, and 21B have an equal diameter.

Further, in the peripheries of the photosensitive drums 21Y, 21M, 21C, and 21B, charger parts 22Y, 22M, 22C, and 22B, developing parts 23Y, 23M, 23C, and 23B containing toners of corresponding colors, transfer parts 26Y, 26M, 26C, and 26B, cleaning parts 24Y, 24M, 24C, and 24B, and dischargers 25Y, 25M, 25C, and 25B are provided respectively.

By this structure, color images corresponding to laser beams 5Y, 5M, 5C, and 5B emitted from the exposure part 5 in accordance with image signals separated for respective colors and scanned by a polygon mirror 5a are formed.

The transfer devices 26Y, 26M, 26C, and 26B are provided at positions opposite to and below the photosensitive drums 21Y, 21M, 21C, and 21B with the transfer belt 6 inserted.

At predetermined positions below the transfer belt 6, paper cassettes 8a and 8b are provided to maintain papers P to which toner images are transferred. The paper cassettes 8a and 8b are provided with pickup rollers 9a and 9b for picking up, one after another, papers P contained in the cassettes. A paper conveyor part 10 comprised of guides and rollers for feeding papers P picked up by the pickup rollers 9a and 9b toward the transfer belt 6 is formed between the transfer belt 6 and each of the cassettes 8a and 8b.

Further, at a predetermined position of the paper conveyor part 10 in the side of the transfer belt 6, an aligning roller 11 for setting a timing at which a paper P is fed toward the transfer belt 6 is provided to align the paper P, which has been picked up from any of the paper cassettes and is being conveyed in the paper conveyor part 10, with positions of images to be formed by the image forming parts 4Y, 4M, 4C, and 4B.

In this color image forming apparatus 1, when an image signal is supplied from the scanner 62 or the external unit 66, the photosensitive drums 21Y, 21M, 21C, and 21b of the image forming parts 4Y, 4M, 4C, and 4B are charged, in time sequence, to predetermined potentials by a charge power source device not shown. Further, a laser beam whose light intensity is intermittently changed on the bases of image signals is irradiated from the exposure part 5 onto the photosensitive drums 21Y, 21M, 21C, and 21B.

In this manner, electrostatic latent images corresponding to a color image to be outputted are formed on the photosensitive drums 21Y, 21M, 21C, and 21B of the four image forming parts 4Y, 4M, 4C, and 4B. The timings at which images are exposed on the photosensitive drums 21Y, 21M, 21C, and 21B of the image forming parts 4Y, 4M, 4C, and 4B are defined in a predetermined order in accordance with the movement of the paper P conveyed on the transfer belt 6.

The electrostatic latent images formed on the photosensitive drums 21Y, 21M, 21C, and 21B of the image forming parts 4Y, 4M, 4C, and 4B are arranged within the same image forming parts 4Y, 4M, 4C, and 4B. Toners are selectively supplied by the developing parts 23Y, 23M, 23C, and 23B containing toners (developing agents) of predetermined colors and are sequentially transferred to the paper P on the transfer belt 6, by the transfer devices respectively opposed to the photosensitive drums 21Y, 21M, 21C, and 21B, with the transfer belt 6 interposed therebetween.

Note that every paper P is picked out from a cassette containing papers P of a size corresponding to a previously selected size or the size of an image exposed by the exposure part 5. Further, each paper P is conveyed to the aligning roller 11 of the paper conveyor part 10 and is temporarily stopped by the aligning roller 11.

Each paper P is fed toward the transfer belt 6 from the aligning roller 11 at a timing of exposure of an image of the first color by the exposure part 5 or a predetermined timing. At this time, the paper P is electrified by a charger (for paper P) provided near the roller in the side of the paper feed part supporting the transfer belt 6, and is brought into tight contact with the transfer belt 6. The paper P on which toners or toner images have been formed by the image forming parts 4Y, 4M, 4C, and 4B is conveyed to the fixing part 7. At this fixing part 7, melted toners are fixed to the paper P.

Next, a motor control part 30 which rotates and controls the photosensitive drums 21Y, 21M, 21C, and 21B will be explained with reference to FIG. 4.

Figure 4:
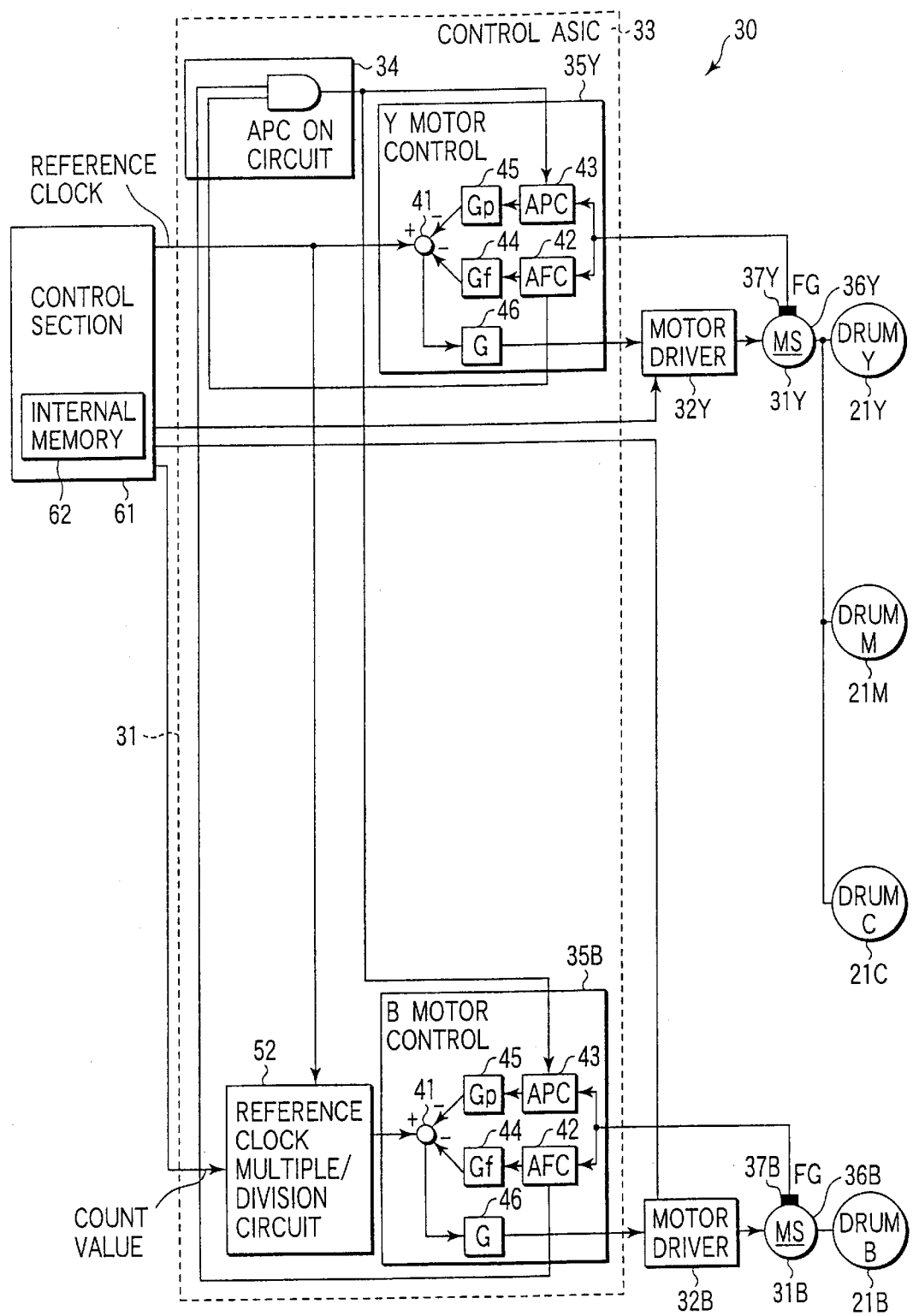
FIG. 4 is a diagram which explains a motor control part 30 for rotating and controlling photosensitive drums 21Y, 21M, 21C, and 21B.

As shown in FIG. 4, the motor control part 30 is constructed by a DC motor 31Y for rotating the photosensitive drums 21Y, 21M, and 21C, a DC motor 31B for rotating the photosensitive drum 21B, motor drivers 32Y and 32B for driving the DC motors 31Y and 31B, and a control circuit 33.

Thus, the embodiment of the present invention adopts the 2-motor system.

The control circuit 33 is constructed by a control ASIC. More specifically, the control circuit 33 is constructed by an APC ON circuit 34, motor control circuits 35Y and 35B, a reference clock multiplication/division circuit 52. The photosensitive drums 21Y, 21M, 21C, and 21B are connected to the DC motors 31Y for rotation and driving through a connection transmission part or the like not shown. These DC motors 31Y and 31B are respectively driven by separate motor control circuits 35Y and 35B.

Figure 5:
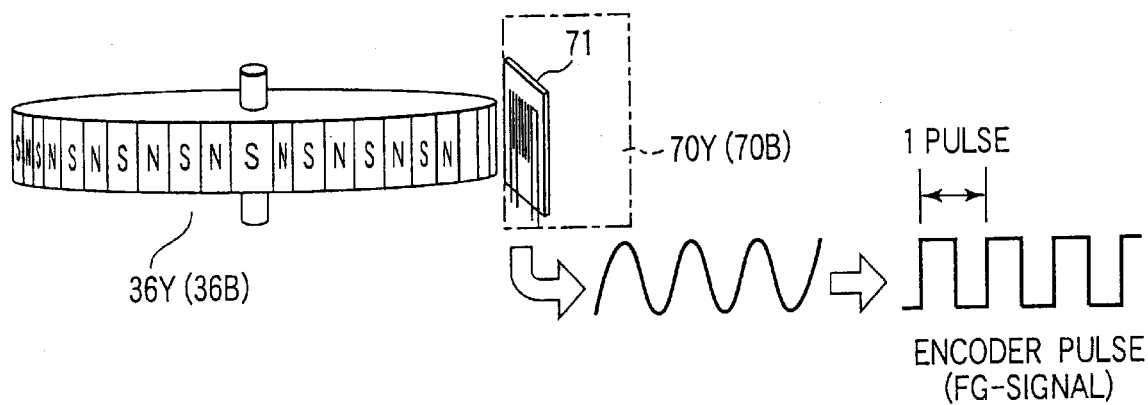
FIG. 5 is a view showing a state where a magnet encoder 36Y (36B) is provided around the rotor or rotation shaft of a DC motor 31Y (31B).

A magnet encoder 36Y (36B) as shown in FIG. 5 is provided around the rotor or rotation shaft of the DC motor 31Y (31B).

An FG signal as an encoder pulse is outputted from an FG signal generation circuit 70Y (70B) including a magnetic resistance element (MR element) provided adjacent to the magnet encoder 36Y (36B). In the magnet encoder 36Y (36B), S and N poles are alternately provided as shown in FIG. 5.

Further, the widths of S and N poles are different at a portion while the widths of S and N poles are equal at the other portions. In this manner, the DC motor 31Y and 31B are rotated and controlled at an equal peripheral velocity by the motor control circuits 35Y and 35B, so that the photosensitive drums 21Y, 21M, 21C, and 21B are rotated at an equal velocity.

Each of the motor control circuits 35Y and 35B is constructed by an adder/subtracter 41, a speed control part (AFC) 42, a phase control part (APC) 43, and amplifiers (Gf) 44, (Gp) 45, and (G) 46.

The adder/subtracter adds clock signals from the control unit 61 or the reference clock multiplication/division circuit 52, and subtracts a signal from the amplifier (Gf) 44 or (Gp) 45. The speed control part (AFC) 42 outputs a signal based on an FG signal from the magnetic resistance element (37Y and 37B).

The phase control part (APC) outputs a signal based on an FG signal from the magnetic resistance element (37Y and 37B). The amplifier (Gf) 44 amplifies a signal from the speed control part (AFC) 42. The amplifier (Gp) 45 amplifies a signal from the phase control part (APC) 43. The amplifier (G) 46 amplifies a signal from the adder/subtracter 41.

Each of the motor control circuits 35Y and 35B is supplied with a generated reference clock in a manner in which an angle target setting value is loaded to the register of the control part (CPU) 61.

In addition, FG signals as encoder pulses are supplied from the magnetic resistance elements 37Y and 37B. Further, the motor control circuits 35Y and 35B are supplied with an APC ON signal from an APC ON circuit 34.

The motor control circuits 35Y and 35B respectively output, to the motor drivers 32Y and 32B, signals for accelerating or decelerating the DC motors 31Y and 31B, with use of the speed control parts (AFC) 42 such that the frequency of the reference clock from the control part 61 or the reference clock multiplication/division circuit 52 matches with the frequency of the FG signal as an encoder pulse from each of the magnetic resistance elements 37Y and 37B.

The phase control parts (APC) 43 of the motor control circuits 35Y and 35B respectively perform control such that the reference clock frequency from the control part 61 is equal to the phase in one pulse of the frequency of the FG signal as an encoder pulse from each of the magnetic resistance elements 37Y and 37B when an APC ON signal is supplied from the APC ON circuit 34.

The APC ON circuit 34 is constructed by an AND circuit and outputs an APC ON signal to the phase control part (APC) 43 of each of the motor control circuits 35Y and 35B.

Thus, if the two DC motors 31Y and 31B respectively use motors which output different numbers of FG pulses per rotation in the present invention, or if motors which respectively output equal numbers of FG pulses per rotation are used at different deceleration ratios, the reference clock is rendered common to both motors and a reference clock multiplication/division circuit 52 is provided before the motor control part 35B.

In this manner, synchronization with the FG cycle can be achieved. This is a feature of the present invention.

For example, if motors which output different numbers of FG pulses per rotation are used, the following is given.

Suppose that FG (YMC)=100 pulses and FG (B)=50 pulses.

FG (YMC): FG (B)=reference clock (YMC): reference clock (B) is satisfied.

From this relationship, reference clock (B)=FG (B)/FG (YMC)*reference clock (YMC) is given.

Therefore, ½ may be set as a count value in the reference clock multiplication/division circuit 52 before the black (B) motor control part 35B.

As another example, the following is given if the deceleration ratios are different between the drive parts of YMC and B.

Suppose that deceleration ratio (YMC)=10 and deceleration ratio (B)=8 are given.

In this case, deceleration ratio (YMC) deceleration ratio (B)=reference clock (YMC): reference clock (B) is given.

From this relationship, reference clock (B)=deceleration ratio (B)/deceleration ratio (YMC)*reference clock (YMC) is given.

Therefore, ⅘ may be set as a count value in the reference clock multiplication/division circuit 52 before the black (B) motor control part 35B.

Further, in another example in which the motors for YMC and B use equal numbers of FG pulses per rotation and also equal deceleration ratios, the reference clock multiplication/division circuit 52 before the black (B) motor control part 35B may be passed through.

As a further example, in order to reduce the difference between the rise time of the motors of the Y, M, and C photosensitive drums having heavy loads and the rise time of the motor of the black photosensitive drum having a light load, the synchronization drive control system adopts a method of adjusting the servo gain of the control circuit of the black photosensitive drum, thereby to delay the rise time of the black photosensitive drum.

As has been explained above, according to the present invention, synchronization with FG cycles can be achieved if FG pulse frequencies outputted from motors are different from each other if two motors separately drive a group of Y, M, and C photosensitive drums and a B photosensitive drum.

Further, if the load to the B photosensitive drum is about ⅓ of that to the Y, M, and C photosensitive drums or if the drive deceleration ratio of the B photosensitive drum is about 3 times that of the Y, M, and C photosensitive drums, the difference in rising/falling time can be reduced between motors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a conveyor unit which conveys an image forming medium;
   an image forming unit having a plurality of photosensitive drums for color components of yellow, magenta, cyan, and black arranged in parallel on the conveyor unit and being rotatable, to transfer images of respective colors to the image forming medium being conveyed by the conveyor unit;
   a first motor which drives all of the photosensitive drums for the color components of yellow, magenta, and cyan through a drive mechanism;
   a second motor which drives the photosensitive drum for the color component of black;
   a reference clock generation circuit which generates a reference clock for driving the motors;
   a first motor control circuit which drives and controls the first motor;
   a second motor control circuit which drives and controls the second motor; and
   a reference clock multiplication/division circuit which multiplies/divides the reference clock, to output a result to the second motor control circuit.

2. The apparatus according to claim 1, wherein
   if the first and second motors which output different numbers of frequency generator (FG) pulses in accordance with rotation of the photosensitive drums are used, the reference clock multiplication/division circuit multiplies/divides a reference clock by a ratio of the numbers of the FG pulses and outputs a result to the second motor control circuit.

3. The apparatus according to claim 1, wherein
   if the first and second motors which output different numbers of FG pulses in accordance with rotation of the photosensitive drums are used, the reference clock multiplication/division circuit multiplies/divides a reference clock by a ratio of deceleration ratios of drive mechanisms and outputs a result to the second motor control circuit.

4. The apparatus according to claim 1, wherein the reference clock multiplication/division circuit adjusts a servo gain of a motor control circuit of the photosensitive drum for the color component of black, to delay a rising time of the photosensitive drum for the color component of black.

5. A method of forming an image, based on a two-motor system in which photosensitive drums for color components of yellow, magenta, and cyan are driven by a first motor controlled by a first motor control circuit and a photosensitive drum for a color component of black is driven by a second motor controlled by a second motor control circuit, the method comprising:

a first step of conveying an image forming medium;

a second step of multiplying/dividing a reference clock to output a clock to the second motor control circuit for driving and controlling the second motor; and a third step of driving the first motor by the first motor controlling circuit based on the reference clock, to drive the photosensitive drums for the color components of yellow, magenta, and cyan, and of driving the second motor by the second motor control circuit based on the multiplied/divided clock, to drive the photosensitive drum for the color component of black, thereby to transfer images of respective colors to the image forming medium.

6. The method according to claim 5, wherein in the second step, if the first and second motors which output different numbers of FG pulses in accordance with rotation of the photosensitive drums are used, a reference clock is multiplied/divided by a ratio of the numbers of the frequency generator (FG) pulses and a result is outputted to the second motor control circuit.

7. The method according to claim 5, wherein in the second step, if the first and second motors which output different numbers of FG pulses in accordance with rotation of the photosensitive drums are used, a reference clock is multiplied/divided by a ratio of deceleration ratios of drive mechanisms and a result is outputted to the second motor control circuit.

8. The method according to claim 5, wherein a servo gain of the second motor control circuit of the photosensitive drum for the color component of black is adjusted to delay a rising time of the photosensitive drum for the color component of black.

* * * * *